United States Patent
Ha

(10) Patent No.: US 6,178,003 B1
(45) Date of Patent: Jan. 23, 2001

(54) METHOD OF AND APPARATUS FOR TRANSMITTING PRINTER CONTROL FILE TO PRINTER

(75) Inventor: Jong-Ho Ha, Gunpo (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 08/885,731

(22) Filed: Jun. 30, 1997

(30) Foreign Application Priority Data

Jun. 28, 1996 (KR) .................................................. 96-25244

(51) Int. Cl.⁷ ....................................................... B41B 3/02
(52) U.S. Cl. .................. 358/1.14; 358/1.09–1.1; 358/1.15–1.17; 358/462; 710/66
(58) Field of Search ........................ 358/462, 1.14–1.17, 358/1.9–1.1; 710/66

(56) References Cited

U.S. PATENT DOCUMENTS

| | | | |
|---|---|---|---|
| 4,555,763 | * 11/1985 | Dahme | ................................... 364/521 |
| 5,227,873 | * 7/1993 | Chiba et al. | ........................... 358/80 |
| 5,497,204 | 3/1996 | Ko . | |
| 5,502,797 | 3/1996 | Bush et al. . | |
| 5,535,312 | 7/1996 | Hammer et al. . | |
| 5,560,718 | 10/1996 | Furuya . | |
| 5,562,351 | 10/1996 | Uematsu | ................................. 400/68 |
| 5,563,987 | 10/1996 | Scott | .................................... 395/115 |
| 5,602,976 | 2/1997 | Cooper et al. . | |
| 5,619,623 | * 4/1997 | Takayanagi et al. | ................. 395/114 |
| 5,680,596 | * 10/1997 | Iizuka et al. | ........................... 395/559 |
| 5,765,874 | * 6/1998 | Chanenson et al. | .................... 283/67 |
| 5,809,265 | * 9/1998 | Blair et al. | ........................... 395/339 |

* cited by examiner

Primary Examiner—Mark Zimmerman
Assistant Examiner—Lance W. Sealgy
(74) Attorney, Agent, or Firm—Robert E. Bushnell, Esq.

(57) ABSTRACT

A method of transmitting a printer control file from a host computer to a printer includes the steps of: checking if a printer control file that is in the same format as stored in a non-volatile memory, has been amended; and if the printer control file is amended, storing the amended printer control file. When this process of storing the printer control file is complete, or if the printer control file has not been amended, then the printer control file is read. The read printer control file is transmitted to the printer.

17 Claims, 2 Drawing Sheets

| 00 | 01 | 02 | 03 | . | . | . | . | . | 0F |
|----|----|----|----|---|---|---|---|---|----|
| 10 | 11 | 12 | 13 | . | . | . | . | . | 1F |
| 20 | 21 | 22 | . | . | . | . | . | . | 25 |
| . |  |  |  |  |  |  |  |  | . |
| . |  |  |  |  |  |  |  |  | . |
| . |  |  |  |  |  |  |  |  | . |
| F0 | F1 | F2 | . | . | . | . | . | . | FF |

METHOD OF AND APPARATUS FOR TRANSMITTING PRINTER CONTROL FILE TO PRINTER

CLAIM OF PRIORITY

This application makes reference to, incorporates the same herein, and claims all benefits accruing under 35 U.S.C. §119 from an application entitled METHOD OF TRANSMITTING PRINTER CONTROL FILE TO PRINTER earlier filed in the Korean Industrial Property Office on Jun. 28, 1996, and there duly assigned Serial No. 96-25244 by that Office.

BACKGROUND OF THE INVENTION

1. Field of the Invention

The present invention relates to a printer. More particularly, it relates to a printer which does not have a non-volatile memory.

2. Description of the Related Art

A non-volatile memory can be a random access memory or an electrically erasable and programmable read only memory (EEPROM) serving as a non-volatile memory. Many common printers are equipped with these types of memories. A non-volatile memory is the storage media of hardware. The non-volatile memory stores various data necessary for the printer operation according to a control system provided by its manufacturer. Such data can include: print identifiers, a page counter (which shows the number of pages printed), ink level, vertical alignment variables, etc. The manufacturer of the printer determines the data; the specification of the data depends on the manufacturer of the printer.

The printer usually has a logic controller to manipulate the data during printing or for the control of the printer. Thus, the data changes as the printing operation is carried out. The information (such as those indicating control and changes), stored in the non-volatile memory, is a printer control file. This printer control file stored in the non-volatile memory is transmitted in series to the control portion. Here lies a disadvantage of non-volatile memory. It takes time to read information stored in the non-volatile memory or to write information thereinto according to the above access mechanism. The control mechanism of the non-volatile memory depends on the manufacturers of the printers. Thus, printers made by different manufacturers have no software compatibility, especially in data read or write operations.

A contemporary process of manufacturing printers requires the addition of a vertical setting. Such a vertical setting must be stored at the initial stage of the manufacturing process of printers. This has disadvantages, especially in yield. When data is read out from or written into the nonvolatile memory, erroneous data can be stored therein due to outside noise. In addition, there is an is increase in the number of components constituting a circuit for driving the non-volatile memory. With an increase in number of components, there comes a corresponding risein the production costs. On this matter, among exemplars of the contemporary practice and art, Cooper et al. (U.S. Pat. No. 5,602,976, Method And Apparatus For Saving Printer Memory, Feb. 11, 1997) discusses a page printer using alternative internal representations for the print data. Should memory overflow at any point in the process, then the rasterizing times for the remaining strips are determined without storirg the raster output. Furuya (U.S. Pat. No. 5,560,718, Label Printer With Simultaneous Printing And Storing, Oct. 1, 1996) discusses a label printer including a frame memory for storing print pattern data. The processing circuit determines an empty area of the frame memory which is different from an area occupied by the to-be-printed print pattern data when issue label data is input from the communication interface. Hammer et al. (U.S. Pat. No. 5,535,312, Apparatus And Method For Managing Memory In A Printing System, Jul. 9, 1996) discusses a printing system including a memory for storing and buffering the image data of a selected print and an image output terminal communicating with the memory. Bush et al. (U.S. Pat. No. 5,502,797, Apparatus With Flash Memory Control For Revision, Mar. 26, 1996) discusses a printer receiving revised operating code in flash memory. The values in new operating code are compared with those in the previous code. Ko (U.S. Pat. No. 5,497,204, Picture Memory System For Video Printer, Mar. 5, 1996) discusses a picture memory system. Picture signals corresponding to one frame or one field are stored into each of a plurality of semiconductor memories. Based on my study of the contemporary art and practice, there is a need for an effective and improved memory system in which the printer has a two-way communication system with the host computer in such a fashion as in the present invention. Among many advantages, at the minimum, this permits the printer to be without a non-volatile memory.

SUMMARY OF THE INVENTION

Thus, an object of the present invention is to provide an improved printer. Another object of the present invention is to provide an improved printer which does not have a non-volatile memory.

Another object of the present invention to provide a method of transmitting a printer control file from a host computer to a printer that does not include a non-volatile memory.

To achieve these and other objects, the present invention is a method of transmitting a printer control file from a host computer to a printer, including the steps of: checking if a printer control file, having the format as stored in a non-volatile memory, has been amended; and if the printer control file is amended, storing the amended printer control file. When this storing of the printer control file is complete, or if the printer control file has not been amended, then the printer control file can be read and transmitted to the printer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings.

Figures 1, 3:
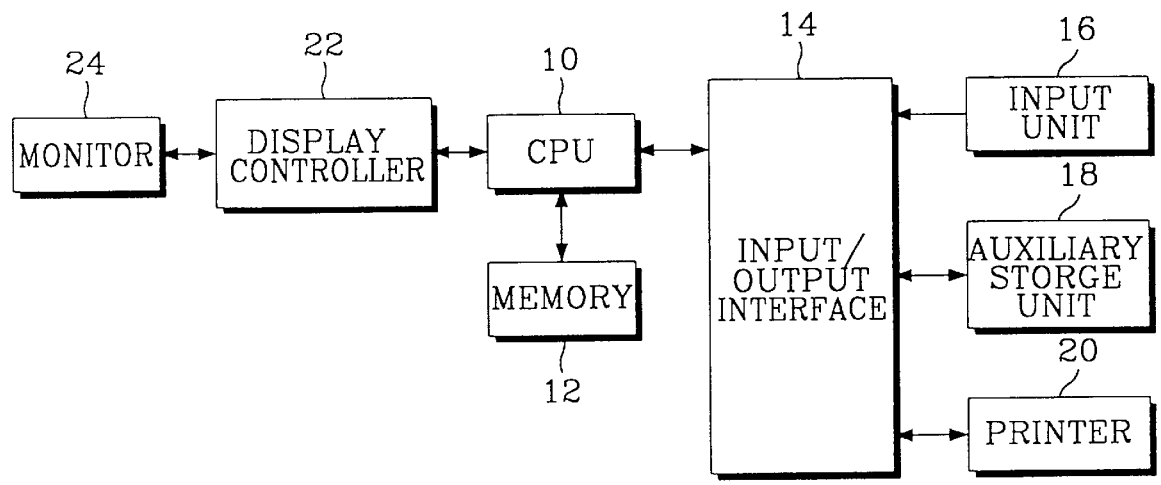
FIG. 1 is a block diagram of a host computer which can be used in accordance with the principles of the present invention.
FIG. 3 depicts the table of one example of a printer control file in accordance with the principles of the present invention.

FIG. 1 shows a block diagram of a host computer. The host computer has a central processing unit (CPU) 10 executing a program to control the overall operation of the host computer. An input/output interface 14 allows interaction between an input unit 16, an auxiliary storage unit 18, and a printer 20. A keyboard or mouse can be used as input unit 16. A hard disk drive or a floppy disk drive is used as auxiliary storage unit 18. A plotter can be used as output unit, instead of printer 20. Printer 20, which allows two-way communication, does not include non-volatile memory. A display controller 22, allows a monitor 24 to display various information processed by CPU 10, under the control of CPU 10. Memory 12 stores the program of CPU 10, and temporarily holds data processed by CPU 10. Memory 12 consists of read only memory and random access memory.

Figure 2:
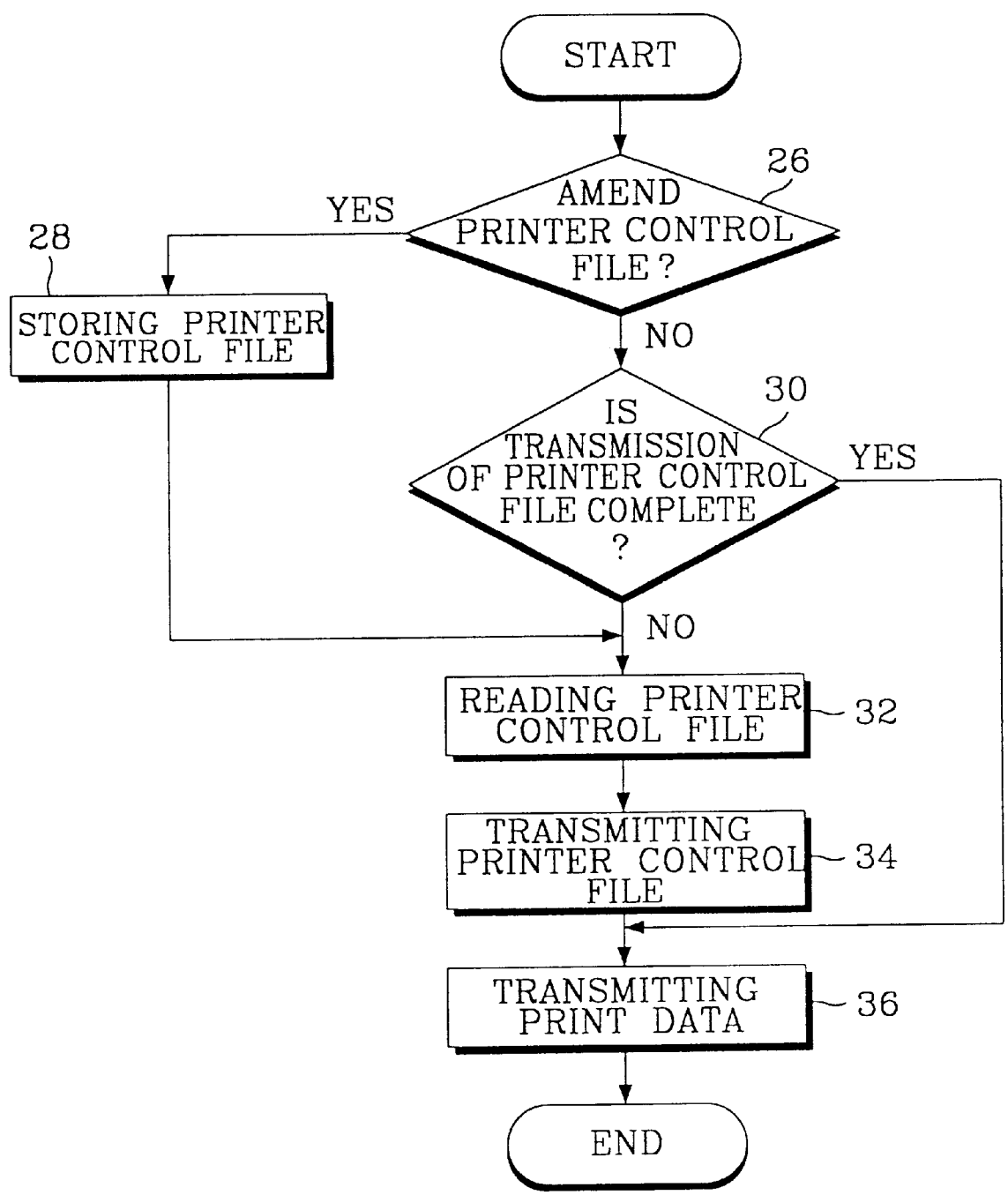
FIG. 2 is a flow chart of the transmission sequence of a printer control file to a printer in accordance with the principles present invention.

FIG. 2 shows a flow chart of the transmission sequence of the printer control file to printer 20 in accordance with the present invention. This preferred embodiment that is shown in FIG. 2 can be used when transmitting a printer control file and printing data from the host computer to printer 20 for printing. This preferred embodiment is provided to the windows printer drive. Information such as paper type, color selection, ink level, print quality, etc. has been provided for the conventional windows printer drive. Information that the conventional non-volatile memory normally contains, is added to the windows printer drive. The above information can be displayed by entering a predetermined key manipulated through the host computer. A user can amend the displayed information. Displaying the new information on the windows printer drive or amending the displayed information is carried out as expected.

FIG. 3 depicts the construction of a printer control file that can be used in accordance with the present invention. The printer control file, shown in FIG. 3, is formed in memory 12 is a host computer, and memory 12 is of block formation that is the same as a non-volatile memory area of printer 20. Blocks of memory 12 can be in units of bit, byte or more since the operating system of memory 12 is more expendable than the operating system of a non-volatile memory would be. When storing the above printer control file, hexadecimal or binary data is stored in a block of memory 12.

The operation can be as follows. When a printer-ON-signal is transmitted from printer 20 to the host computer, or data is sent to printer 20 for the printing, CPU 10 carries out the procedure of transmitting the printer control file for the windows printer drive. This means that CPU 10 checks (S26 of FIG. 2) if the printer control file is amended or not. When the printer control file has been amended, CPU 10 goes to Step 28, otherwise it goes to Step 30. At step 28, CPU 10 stores the amended printer control file in memory 12. When the amended file is stored, CPU 10 proceeds to Step 32. CPU 10 checks (S30) if the transmission of the printer control file is complete. When the transmission is complete, CPU 10 proceeds to Step 36, otherwise, it goes to Step 32. CPU 10 reads (S32) the printer control file from memory 12, and transmits (S34) it to printer 20. When the transmission is complete, CPU transmits (S36) the print data to printer 20. This completes this part of the procedure.

Due to the present invention, there is no need to install a non-volatile memory in the printer. This is because the printer control file is transmitted to the printer in the above-described way. This lowers the production costs. Also, the present invention does not require the process of setting an initial printer control file in the non-volatile memory, thus enhancing the manufacturing efficiency. In addition, the present invention prevents the generation of erroneous data due to noise occurring during accessing the non-volatile memory which makes it easy for a user or service person to confirm the printer control file, thereby facilitating corrective maintenance. The present invention allows a printer control file to be stored as a general computer program, and assures compatibility with different types of printers.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for transmitting a printer control file for controlling a printing operation, comprising:

a printer having a windows printer drive and a logic controller, said printer for receiving a printer control file and printing data from a host computer, the logic controller of said printer for manipulating and changing the printing data during a printing operation and a control operation in accordance with the printer control file, the printer control file containing and keeping control data in accordance with a printer control system for controlling said printing operation of said printer by running said control operation using said windows printer drive for information that is contained in a non-volatile memory of a printer without using a non-volatile memory for said printer, the control data including a print identifier indicating a type of printing, a page counter indicating a number of pages of printing, an ink level, vertical alignment information indicating a vertical alignment, and horizontal alignment information indicating a horizontal alignment; and a host computer comprising:

a memory for storing the printer control file, said memory having block formations compatible with non-volatile memory devices;

a monitor for displaying windows data for the windows printer drive, the windows data containing information concerning a type of paper used in the printing operation, a selection of color used in the printing operation, the ink level, and a quality of print into used in the printing operation;

a display controller for controlling and amending the windows data;

a central processing unit to check whether the printer control file has been amended, to command said memory of said host computer to store the printer control file in said memory of said host computer and to store in said memory of said host computer an amended printer control file as the printer control file when the printer control file has been amended, to check whether a transmission of the printer control file to said printer has been completed, to read the printer control file when the transmission of the printer control file to said printer has not been completed, to transmit the printer control file to said printer, and to transmit the printing data to said printer;

an input and output interface for transmitting the printer control file to said printer when a printing command is transmitted from said host computer to said printer;

an input unit having keys for permitting a user to enter data to amend the windows data and to control said display controller in response to selective manipulation of at least one of said keys; and an auxiliary storage unit to store computer data manipulable into the printing data.

2. An apparatus for transmitting a printer control file for controlling a printer from a host computer to a printer, comprising:

a memory of said host computer for storing a printer control file for a printer in said memory of said host computer;

a monitor of said host computer for displaying said printer control file stored in said memory of said host computer;

an input unit of said host computer for revising said printer control file into a revised printer control file in response to a user selectively manipulating at least one key of said input unit, said revised printer control file being stored in said memory of said host computer as said printer control file in accordance with a selection by the user; and a processor of said host computer for reading said printer control file from said memory of said host computer and then transmitting said printer control file read from said memory of said host computer to said printer, when a printing command is transmitted from said host computer to said printer, for running a control operation of said printer using said printer control file transmitted from said host computer using a windows printer drive for said printer for information that is contained in a non-volatile memory of a printer without using a non-volatile memory for said printer.

3. The apparatus of claim 2, further comprising:

an input/output interface for transmitting printing data from said host computer to said printer.

4. The apparatus of claim 2, wherein said printer control file comprises a print identifier information, an ink level information and a vertical alignment information.

5. The apparatus of claim 3, wherein said printer control file comprises a print identifier information, an ink level information and a vertical alignment information.

6. The apparatus of claim 2, further comprising:

an input/output interface for transmitting said printer control file to said printer when said printer is turned on.

7. The apparatus of claim 3, wherein said input/output interface is for transmitting said printer control file to said printer when said printer is turned on.

8. The apparatus of claim 4, further comprising:

an input/output interface for transmitting said printer control file to said printer when said printer is turned on.

9. The apparatus of claim 5, wherein said input/output interface is also for transmitting said printer control file to said printer when said printer is turned on.

10. A method for transmitting a printer control file for controlling a printer from a host computer to a printer, comprising the steps of:

providing a host computer, said host computer including a memory for storing a printer control file, an input unit having at least one key for entering data for said printer control file in response to selective manipulation of said at least one key by a user, and a monitor for displaying said printer control file;

providing a printer for receiving from said host computer printing data for a printing operation and for receiving from said host computer said printer control file for running a control operation of said printer for said printing operation using a windows printer drive for said printer for information that is contained in a non-volatile memory of a printer without using a non-volatile memory for said printer;

storing said printer control file for said printer in said memory of said host computer;

displaying said printer control file on said monitor in response to the user selectively manipulating the at least one key of said input unit;

revising said printer control file displayed on said monitor into a revised printer control file in response to the user selectively manipulating the at least one key of said input unit, and then storing in said memory of said host computer said revised printer control file as said printer control file in accordance with a selection by the user, when said printer control file is to be revised; and reading said printer control file from said memory of said host computer and then transmitting said printer control file from said host computer to said printer when a printing command is transmitted form said host computer to said printer.

11. The method of claim 10, further comprising the steps of:

transmitting printing data from said host computer to said printer; and printing said printing data transmitted from said host computer.

12. The method of claim 10, wherein said printer control file comprises a print identifier information, an ink level information and a vertical alignment information.

13. The method of claim 11, wherein said printer control file comprises a print identifier information, an ink level information and a vertical alignment information.

14. The method of claim 10, further comprising the step of:

transmitting said printer control file to said printer when said printer is turned on.

15. The method of claim 11, further comprising the step of:

transmitting said printer control file to said printer when said printer is turned on.

16. The method of claim 12, further comprising the step of:

transmitting said printer control file to said printer when said printer is turned on.

17. The method of claim 13, further comprising the step of:

transmitting said printer control file to said printer when said printer is turned on.

* * * * *